(12) United States Patent
Hurtta et al.

(10) Patent No.: US 8,488,462 B2
(45) Date of Patent: Jul. 16, 2013

(54) HANDLING TRAFFIC FLOWS IN A MOBILE COMMUNICATIONS NETWORK

(75) Inventors: Tuija Hurtta, Espoo (FI); Antti Pikkusaari, Espoo (FI); Zoltan Olah, Espoo (FI)

(73) Assignee: Nokia Corporation, Espoo (FI)

( * ) Notice: Subject to any disclaimer, the term of this patent is extended or adjusted under 35 U.S.C. 154(b) by 1308 days.

(21) Appl. No.: 10/331,941

(22) Filed: Dec. 31, 2002

(65) Prior Publication Data

US 2004/0125748 A1 Jul. 1, 2004

(51) Int. Cl.
 *H04L 12/28* (2006.01)
(52) U.S. Cl.
 USPC ..................................... 370/235; 370/395.21
(58) Field of Classification Search
 None
 See application file for complete search history.

(56) References Cited

U.S. PATENT DOCUMENTS

| | | | |
|---|---|---|---|
| 6,463,470 B1 | 10/2002 | Mohaban et al. | |
| 6,621,793 B2* | 9/2003 | Widegren et al. | 370/230.1 |
| 6,775,534 B2* | 8/2004 | Lindgren et al. | 455/404.1 |
| 6,845,100 B1* | 1/2005 | Rinne | 370/395.43 |
| 7,002,935 B2* | 2/2006 | Kriaras et al. | 370/328 |
| 7,106,718 B2* | 9/2006 | Oyama et al. | 370/340 |
| 7,145,919 B2* | 12/2006 | Krishnarajah et al. | 370/474 |
| 7,230,937 B2* | 6/2007 | Chi et al. | 370/329 |
| 7,337,236 B2* | 2/2008 | Bess et al. | 709/240 |
| 7,546,376 B2* | 6/2009 | Widegren et al. | 709/232 |
| 2001/0027490 A1* | 10/2001 | Fodor et al. | 709/238 |
| 2002/0036983 A1* | 3/2002 | Widegren et al. | 370/230.1 |
| 2002/0114305 A1* | 8/2002 | Oyama et al. | 370/338 |
| 2002/0120749 A1* | 8/2002 | Widegren et al. | 709/227 |
| 2002/0133600 A1* | 9/2002 | Williams et al. | 709/228 |
| 2003/0088675 A1* | 5/2003 | Zheng | 709/227 |
| 2003/0203736 A1* | 10/2003 | Chi et al. | 455/450 |

FOREIGN PATENT DOCUMENTS

| | | |
|---|---|---|
| WO | WO 01/28160 A2 | 4/2001 |
| WO | WO 02/056614 A1 | 7/2002 |
| WO | WO 02/104046 A1 | 12/2002 |

\* cited by examiner

*Primary Examiner* — Gregory Sefcheck
(74) *Attorney, Agent, or Firm* — Mintz, Levin, Cohn, Ferris, Glovsky & Popeo, P.C.

(57) ABSTRACT

A method and system of handling traffic flows across a network is disclosed. The method includes issuing a request for establishing a first communication pathway end to end over the network, the communications pathway including the radio communication channel and the packet communication channel, the request identifying multiple traffic flows with their associated attributes. The method further includes identifying any of the traffic flows which require a different flow treatment across the network, and establishing the first communication pathway, and at least one second communication pathway end to end over the network, the second communication pathway providing a different flow treatment.

38 Claims, 6 Drawing Sheets

HANDLING TRAFFIC FLOWS IN A MOBILE COMMUNICATIONS NETWORK

FIELD OF THE INVENTION

The present invention relates to the handling of traffic flows in a mobile communications network, and in particular in a network which has access to an external packet data network such as the internet or any other packet-based system.

BACKGROUND OF THE INVENTION

Mobile communications systems refers generally to any telecommunications systems which enable a wireless communication when users are moving within the service area of the system. A typical mobile communications systems is a Public Land Mobile Network (PLMN).

Often the mobile communications network is an access network providing a user with a wireless access to external networks, hosts, or services offered by specific service providers. The user must have a subscribership with the mobile communications system in order to be able to use the services of the mobile system. Normally, in addition to the mobile subscribership, a separate subscribership is needed with each one of the other service providers whose services are accessed through the mobile communications network. The mobile subscriber data of the user may indicate which external service the user is authorized to use and to which access point or gateway node the service request should be routed. The access point or gateway node then provides further access to an external network or an external host. In this case the service request is routed on the basis of a service definition in the mobile subscriber data stored by a mobile network operator, and therefore there is no need for further authentication of the user by the gateway or the service provider.

It is, however, desirable that the user is able to select the service provider or the most suitable access point of the service provider. For example, the use of the TCP/IP (Transmission Control Protocol/Internet Protocol) data network, i.e. the Internet network has increased very rapidly. Before the user can connect to the Internet, he has to have a contract with an Internet service provider ISP, who provides access to the Internet via one or more Internet access points IAP.

The general packet radio service GPRS is a new service in the GSM system, and is one of the objects of the standardization work of the GSM phase 2+ at ETSI (European Telecommunication Standard Institute). The GPRS operation environment comprises one or more subnetwork service areas, which are interconnected by a GPRS backbone network. A subnetwork comprises a number of packet data service nodes SN, which in this application will be referred to as serving GPRS support nodes SGSN, each of which is connected to the SM mobile communication network (typically to base station systems by way of radio network controllers (RNC)) in such a way that it can provide a packet service for mobile data terminals via several base stations, i.e. cells. The intermediate mobile communication network provides packet-switched data transmission between a support node and mobile data terminals. Different subnetworks are in turn connected to an external data network, e.g. to a public switched data network PSPDN, via GPRS gateway support nodes GGSN. The GPRS services thus allows to provide packet data transmission between mobile data terminals and external data networks when the GSM network functions as an access network.

In GPRS network the mobile station MS may optionally indicate, in a message requesting to activate a packet data protocol (PDP) context in the network, an access point name for selection of a reference point to a certain external network. A Serving GPRS support node SGSN authenticates the mobile user and sends a PDP context creation request to a gateway node GGSN selected according to a GGSN address stored in the subscriber data or according to the access point name given by the MS, or to default GGSN known by the SGSN.

In such a network, a packet data protocol (PDP) context is established to carry traffic flows over the network, each PDP context including a radio bearer provided between the user equipment and the radio network controller, a radio access bearer provided between the user equipment, the radio network controller and the SGSN, and switched packet data channels provided between the serving GPRS service node and the gateway GPRS service node. Each PDP context can carry more than one traffic flow, but all traffic flows within one particular PDP context are treated the same way as regards their transmission across the network. The PDP context treatment requirement is based on PDP context treatment attributes associated with the traffic flows, for example quality of service and/or charging attributes.

Currently, if a traffic flow is identified as needing a different flow treatment, this can be achieved by the user equipment (UE) generating a request for a secondary PDP context over the network. Currently, such a request can only be initiated by the UE, and cannot be determined by the network itself. There are business models that require intelligence in the network or at the application side to define the end to end (e2e) or local treatment of traffic related to certain applications. At present, these business models cannot be readily implemented.

SUMMARY OF THE INVENTION

According to one aspect of the invention there is provided a method of handling traffic flows across a network wherein each traffic flow is associated with at least one flow treatment attribute determining the flow treatment requirement for that traffic flow and wherein the network comprises at least one user terminal, at least one radio network node with means for establishing a radio communication channel between said user terminal and said radio network node and at least one packet network node with means for establishing a packet communication channel in the network, the method comprising: issuing a request for establishing a first communications pathway end to end over the network, said communications pathway including said radio communication channel and said packet communication channel, said request identifying multiple traffic flows with their associated attributes; identifying any of said traffic flows which require a different flow treatment across the network; and establishing said first communication pathway, and at least one second communication pathway end to end over the network said second communication pathway providing a different flow treatment.

Preferably, the step of identifying traffic flows with different treatment is based on their associated attributes.

Another aspect of the invention provides a communications network for handling traffic flow, wherein each traffic flow is associated with at least one flow treatment attribute determining the flow treatment requirement for that traffic flow, the network comprising at least one user terminal, at least one radio network node with means for establishing a radio communication channel between said user terminal and said radio network node, and at least one packet network node with means for establishing a packet communication channel, wherein: the user terminal or the packet network node is configured to issue a request for establishing a first communication pathway end to end over the network, said communication pathway including said radio communication channel and said packet communication channel, said request identifying multiple traffic flows with their associated attributes; the network comprising means for identifying any of said traffic flows which require a different flow treatment across the network; and means for establishing said first communication pathway and at least one second communication pathway end to end over the network, said second communication pathway providing a different flow treatment.

According to the following described embodiments, a policy control function node in the network, or a local policy decision point of a GGSN node in the network makes a decision where a flow of a PDP context should get different treatment e2e over the network.

In a first embodiment, if it is identified that flow should get different treatment, the policy control function node (or local policy decision point of the GGSN node) causes the GGSN node to initiate network requested secondary PDP context activation. The decision is based on flow treatment attributes defined with the traffic flows in the PDP context.

Once a secondary PDP context is established, all UMTS nodes in the network can treat the PDP context as a whole and therefore there is no need to implement flow-based functions in individual network nodes. The possibility to provide such e2e different treatment over the network allows the possibility to make network resource allocation and corresponding charging decisions on an end user, service or provider basis.

As an alternative to the establishment of a secondary PDP context initiated at the policy control function node or the GGSN node, in a second embodiment, the flow treatment attributes can be sent to a serving GPRS service node in the network, which then establishes multiple radio access bearers (RABs) for one PDP context.

As a further alternative, in a third embodiment, a radio network controller node of the network establishes multiple radio bearers for one radio access bearer.

In the following described embodiment, the policy control function node is illustrated as making a decision to determine differing treatment of flows based on flow attributes defined with the traffic flows themselves. However, it would be possible to invoke different treatment of flows by GGSN external or internal packet analysis. In the case of an external packet analysis, the information could be delivered to the GGSN by any standard or proprietary protocol, for example with RADIUS messages.

BRIEF DESCRIPTION OF THE DRAWINGS

For a better understanding of the present invention and to show how the same may be carried into effect, reference will now be made by way of example to the accompanying drawings.

DESCRIPTION OF THE PREFERRED EMBODIMENT

Figure 1:
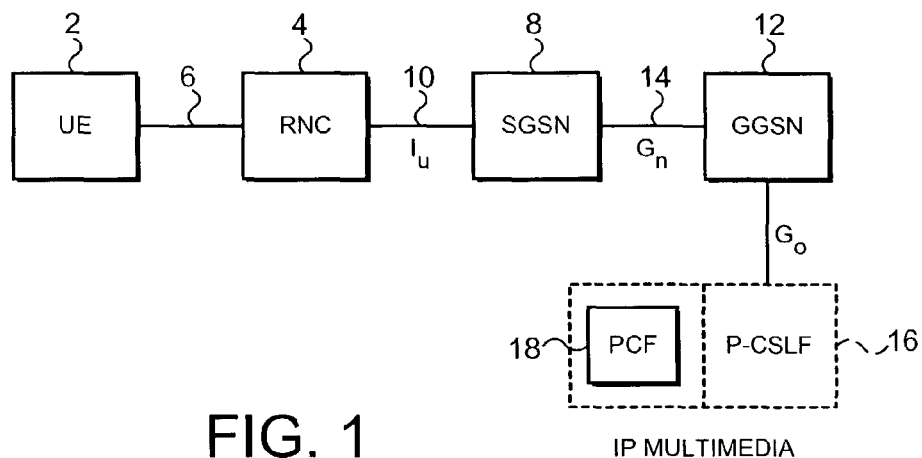
FIG. 1 is a schematic block diagram of a communications network.

FIG. 1 illustrates the nodes of a network by way of background to the present invention. Reference numeral 2 denotes user equipment UE, for example mobile stations. User equipment UE is in communication with a radio network controller 4 via radio network channels 6 which are referred to herein as radio bearers RB. These radio network channels are set up in a mobile telecommunications network in a known manner. Each user equipment UE can have one or more radio network channel open at any one time with the radio network controller 4, and there can of course be a number of user equipments in communication with the radio network controller by way of individual radio network channels as is well known in the art. The radio network controller is in communication with a serving GPRS support node 8 via an Iu interface 10. The serving GPRS support node 8 communicates with a gateway GPRS support node 12 via a $G_n$ or $G_p$ interface 14, which is a switched packet data interface. As is well known, the serving GPRS support node 8 and the gateway GPRS support node 12 provide support for GPRS services in the network. The gateway GPRS support node 12 is under the control of a policy decision function 18. The policy decision function may be standalone or may be combined with an application function such as a proxy connection state control function P-CSCF 16.

Figure 1A:
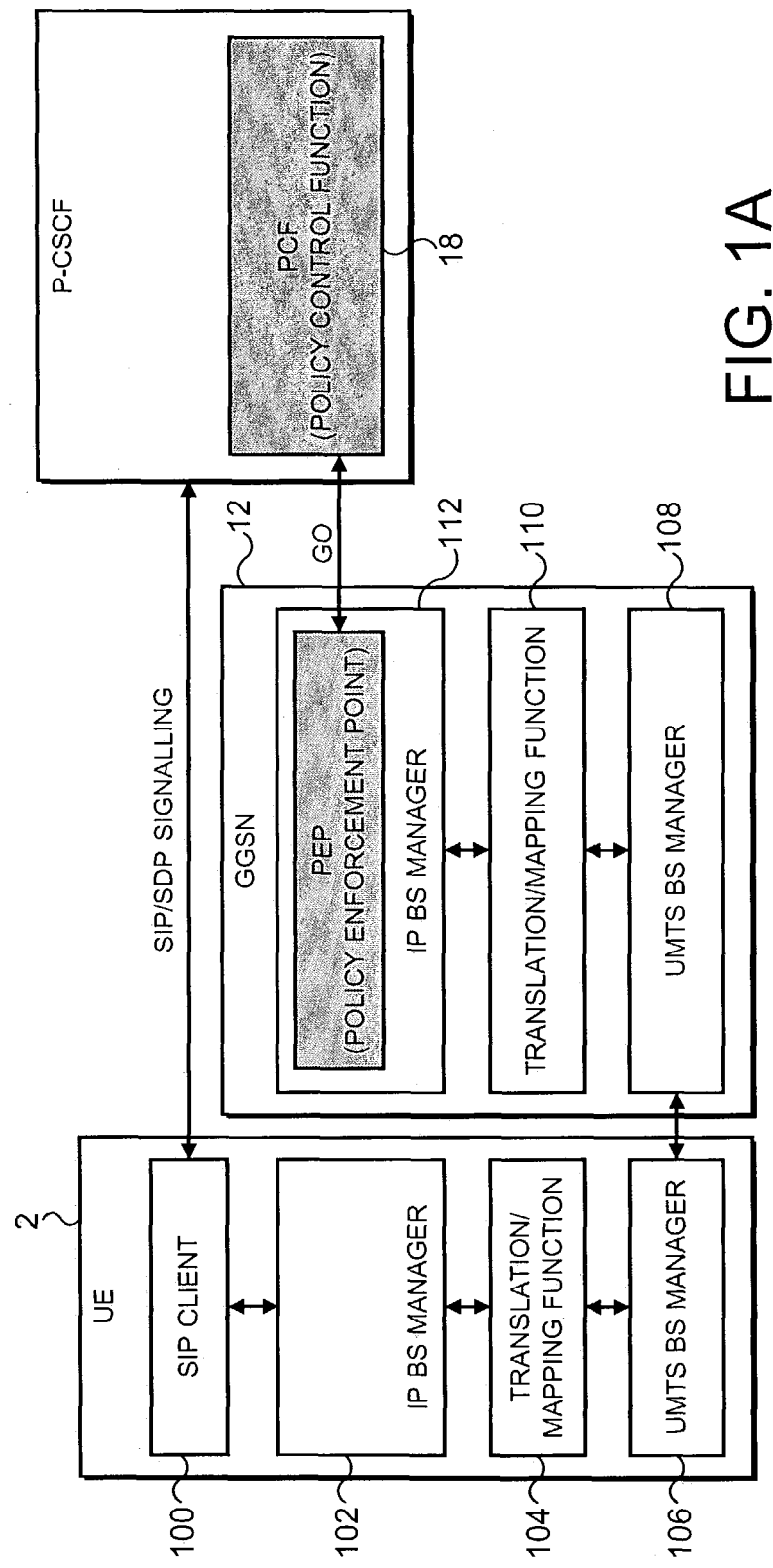
FIG. 1A illustrates the architectural elements of the scheme of FIG. 1.

FIG. 1A illustrates the relationship between the different functional entities, but with the omission of the network elements which are not involved in service-based local policy (in particular radio network controller RNC and the serving gateway support node SGSN). FIG. 1A indicates that the user equipment 2 comprises an SIP client 100, an IPBS manager 102, a translation mapping function 104 and a UMTSBS manager 106. The UMTSBS manager 106 is in connection with the GGSN 12 by way of its own UMTSBS manager 108. The GGSN 12 also includes a translation mapping function and an IPBS manager 112 with a policy enforcement point. The policy enforcement point is in connection with the policy control function 18 forming part of the P-CSCF node in one embodiment.

Figure 2:
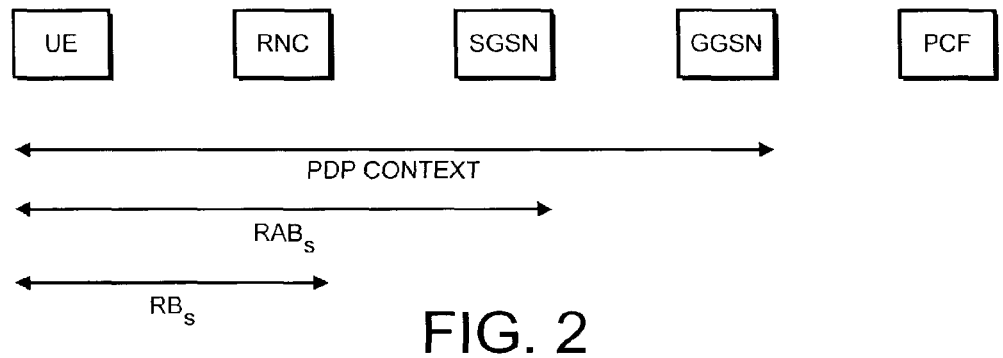
FIG. 2 is a schematic diagram illustrating the logical semantics of communication pathways in the network.

The communications semantics across the nodes of the network illustrated in FIG. 1 are shown in FIG. 2. Overall communication between user equipment 2 and the gateway GPRS support node 12 is provided by a packet data protocol (PDP) context. Each PDP context provides a communication pathway between a particular user equipment 2 and the gateway GPRS support node 12 and, once established, can carry multiple flows. Each flow represents for example a particular service or a media component of a particular service. The PDP context therefore represents a logical communication pathway for one or more flow across the network. To implement the PDP context between user equipment 2 and the serving GPRS support node 8, radio access bearers RAB are established which allow for data transfer across the radio bearer 6 and the Iu interface 10. The physical channels established between the user equipment 2 and the radio network controller 4 are referred to as radio bearers RB. The implementation of these logical and physical channels is known and is therefore not discussed further herein.

In existing systems, multiple flows within a PDP context are all treated in the same manner based on PDP context attributes, such as quality of service (QoS) or charging treatment. The possibility exists to create a secondary PDP context at the user equipment so that certain flows from the user equipment can be treated differently in their transmission across the network. For example, there are a number of quality of service traffic classes applying to flows of differing kinds: conversational, streaming, interactive and background. Depending on the nature of the data to be transmitted across the network, the appropriate quality of service is requested by the user equipment 2 and is authorized by the network.

Figure 2A:
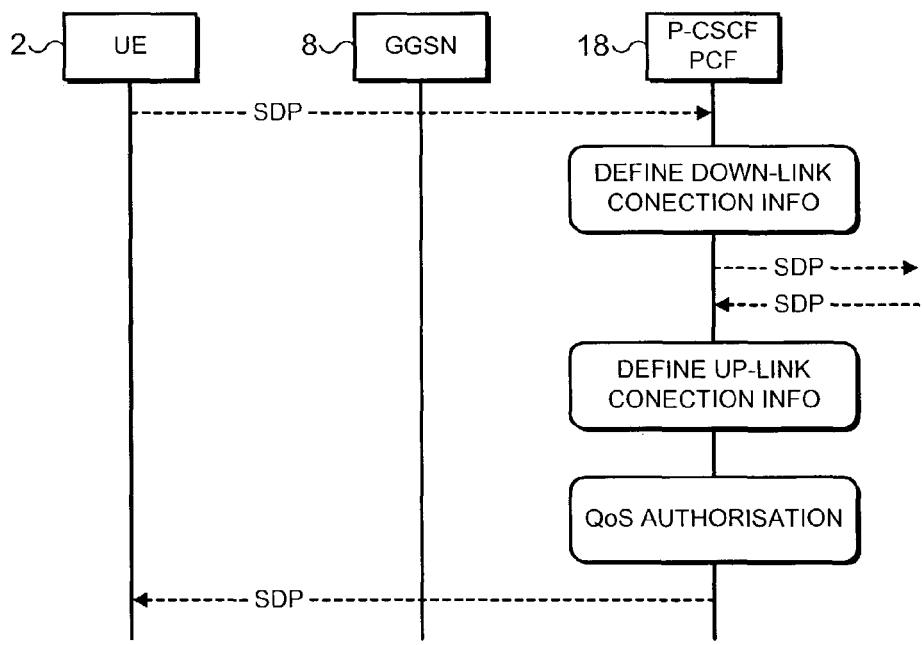
FIG. 2A is a diagram illustrating authorisation of resources at the PCF.

By way of background, reference is made to FIG. 2A which is a schematic diagram illustrating the authorisation of QoS resources at an originating PCF.

The PCF 18 obtains SDP parameters defined by the originator and identifies the connection information needed (for example IP address of the downlink media flow, media ports to be used etc.). The PCF 18 obtains the negotiated SDP parameters from the terminating side through an SIP signalling interaction. The PCF 18 then identifies the connection information needed to define the uplink connection. SDP parameters are used by the PCF 18 in order to define the QoS resource authorisation. The PCF 18 authorises each media component negotiated for the session which is expressed in terms of IP QoS parameters. An authorisation token is generated by the PCF and sent to the UE.

There follows a description of techniques which allow for differing treatment of flows based on intelligence in the network.

Figure 3:
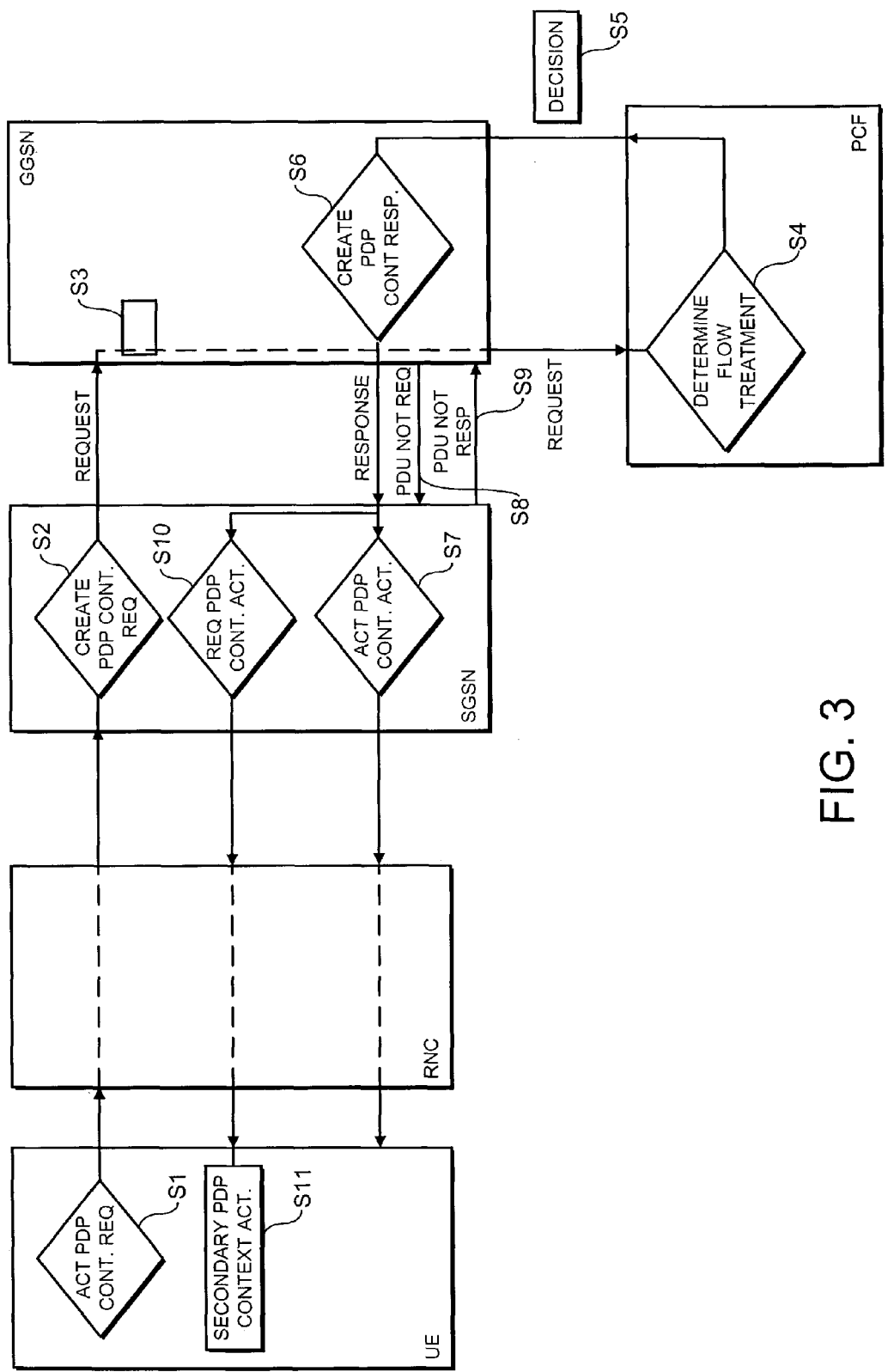
FIG. 3 is a schematic functional diagram of a first embodiment of the invention.

FIG. 3 is a schematic diagram illustrating a first embodiment in which two PDP contexts are created by the policy decision function PDF 18 dependent on the nature of the flows.

The user equipment 2 generates (step S1) a request for activating a PDP context across the network. The request includes an authorisation token and, in this embodiment, three traffic flow identifiers Flow1, Flow2 and Flow3. This request is carried from the user equipment UE to the serving GPRS support node SGSN. The SGSN 8 creates (step S2) a PDP context request for transmission to the GGSN 12, which itself creates (step S3) a request to the policy decision function PDF 18. The policy decision function 18 determines (step S4) the treatment required for each flow, and in particular establishes whether any of the flows should be treated differently. A decision (step S5) is returned from the policy decision function 18 to the GGSN 12 defining a packet classifier for each flow to identify the flow in the network, the attributes of each of the flows, Flow1, Flow2 and Flow3 and also determining that a different treatment is required for Flow3. The GGSN 12 then creates a PDP context response (step S6) which identifies the fact that a different treatment is required for Flow3. The GGSN may indicate this fact implicitly (e.g. by indicating the flows Flow1 and Flow2 accepted for the PDP context) or explicitly (e.g. by indicating that the flow Flow3 requires a different treatment). The SGSN 8 acknowledges (step S7) the PDP context acceptance to the user equipment 2, establishing the PDP context for Flow1 and Flow2, and identifying Flow3 as needing different treatment. In addition, the GGSN 12 initiates network requested secondary PDP context activation by establishing (step S8) a PDU (protocol data unit) request identifying the Flow3 attributes to the SGSN 8. The SGSN 8 responds (step S9) by returning a PDU response to the GGSN, which can then optionally report back to the policy decision function 18 the fact that the network requested secondary PDP context activation was initiated. The SGSN then also requests (step S10) a secondary PDP context activation in relation to the attributes and packet classifiers for Flow3 to the user equipment UE. The user equipment UE then goes through the PDP context establishment process again (step S11) to create a further secondary PDP context according to steps S1 to S7 as illustrated in FIG. 3. At this phase, steps S3 to S5 are not required. When the secondary PDP context is activated, the GGSN can optionally report to the policy decision function 18 the fact that the secondary PDP context is successfully activated.

This technique allows for the GGSN under the control of the policy decision function 18 to request a further PDP context establishment for the flow (in this case Flow3) requiring different treatment. It is of course possible that multiple network requested secondary PDP context activation procedures are established. This is the case e.g. if all flows Flow1, Flow2 and Flow3 require different treatment.

Figure 4:
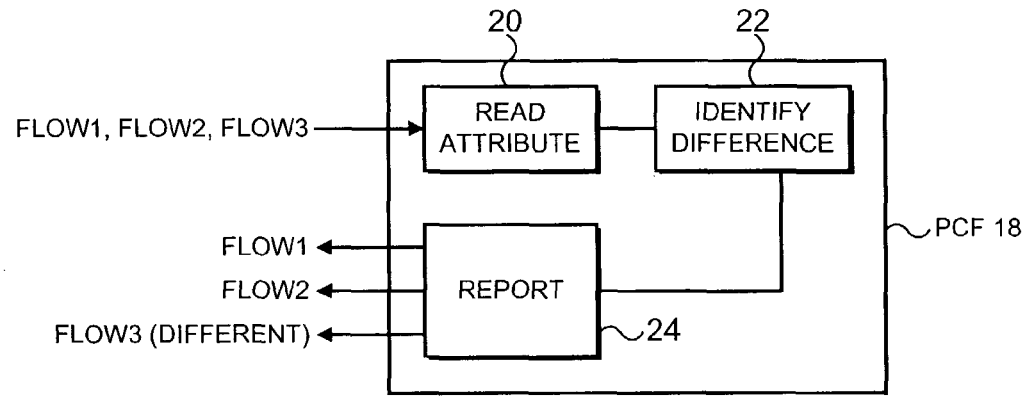
FIG. 4 is a schematic block diagram illustrating functionality in the policy control function node for implementing the embodiment of FIG. 3.

It will be appreciated that in order to implement the functionality explained above with reference to FIG. 3, the policy decision function 18 incorporates the functionality illustrated in FIG. 4. That is, it includes a block 20 for reading the attributes on incoming flows, a block 22 for identifying the difference between the attributes and a block 24 for reporting the flow attributes and identifying any different treatment required. These functional blocks can be implemented in any suitable way, and most probably will be implemented by a suitably programmed processor or other software/hardware combination.

The functional blocks referred to above and illustrated in FIG. 4 could as an alternative be implemented at the GGSN 12 itself, without the need for a separate PDF block.

Figure 5:
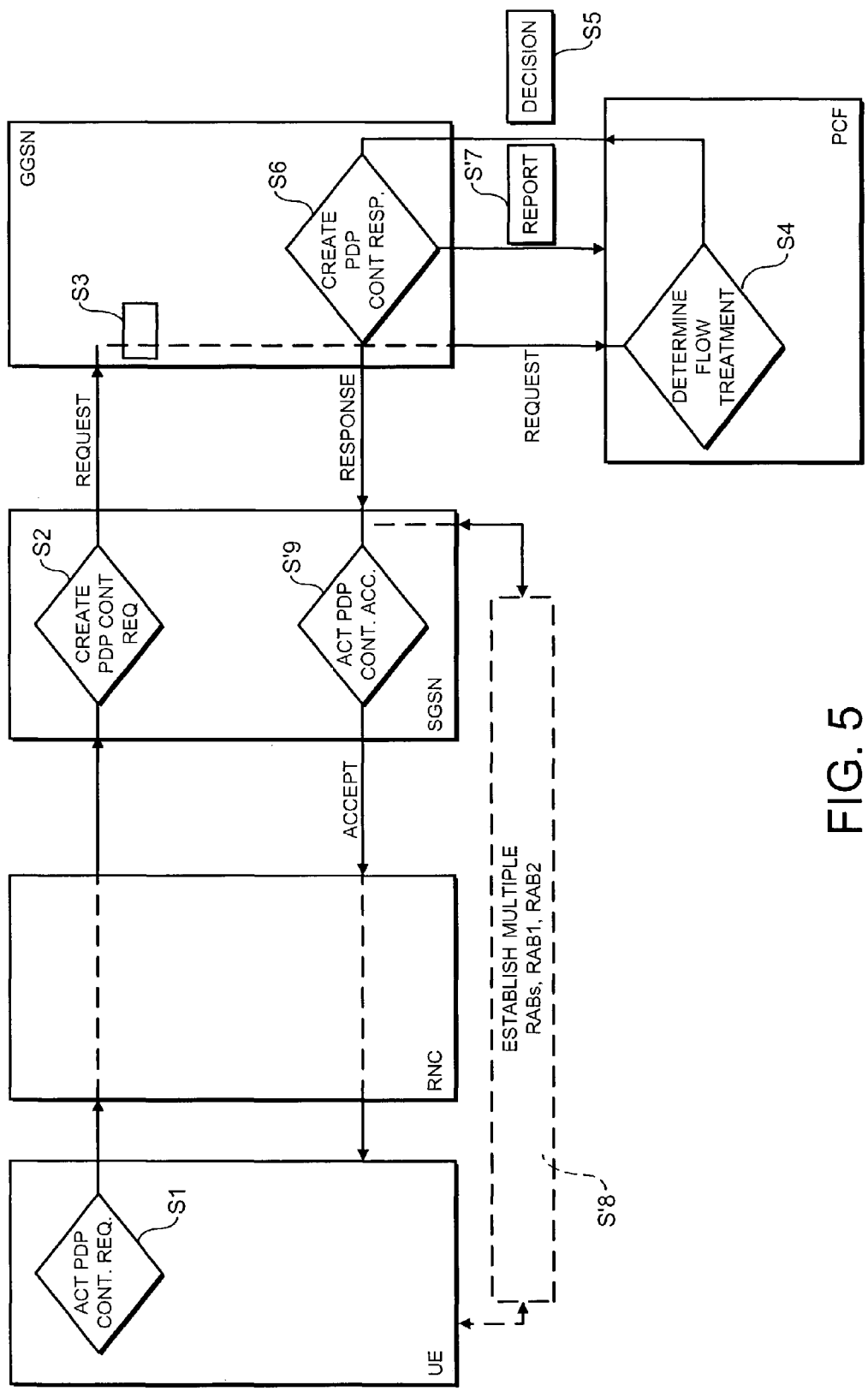
FIG. 5 is a schematic functional diagram illustrating a second embodiment of the invention.

A second embodiment of the invention is illustrated in FIG. 5. According to this embodiment, steps S1 to S6 are the same as described above with reference to FIG. 3. In this case however, instead of causing the user equipment 2 to create a further PDP context as in step 11 of FIG. 3, the SGSN 8 is caused (step S'8) to establish multiple radio access bearers with different attributes to accommodate the different treatment required for Flow3. To achieve this, a packet classifier and the attributes of each of the flows are supplied to the SGSN 8 from the GGSN 12. In the example given, a first radio access bearer RAB1 is established for Flow1 and Flow2 and a second radio access bearer RAB2 is established for Flow3. The SGSN 8 identifies traffic flows with packet classifiers and can classify traffic flows to the correct radio access bearers. At step S'9 a PDP context activation acceptance is generated by the SGSN.

Figure 6:
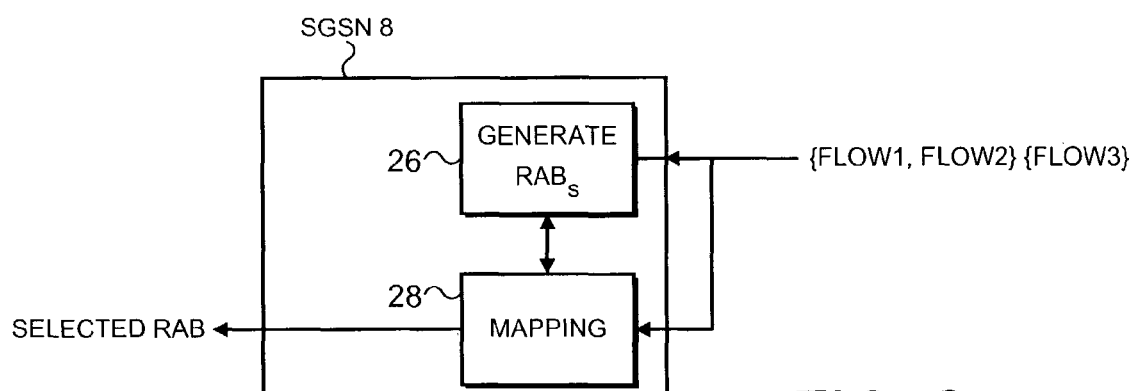
FIG. 6 is a schematic block diagram of the functionality incorporated in the SGSN for implementing the embodiment of FIG. 5.

In order to implement the technique of FIG. 5, the SGSN 8 incorporates the functionality illustrated in FIG. 6 in the form of the following functional blocks. When the radio access bearers are created, the SGSN 8 requests as many radio access bearers as there are different treatments, as indicated schematically in the block generate RABs 26. Then, when traffic starts flowing, the SGSN 8 identifies a traffic flow with a packet classifier in a mapping function 28 and maps that traffic flow into the correct radio access bearer which is then used when the SGSN 8 forwards traffic towards the user equipment UE.

The user equipment UE is informed which traffic flows are carried on which radio access bearers. In the example given, the user equipment UE receives flow specific packet classifiers and flow attributes for RAB1 and RAB2. This way, the user equipment UE knows that RAB1 carries Flow1 and Flow2 and RAB2 carries Flow3 and thus the user equipment UE can send traffic to the network on the correct radio access bearers. The user equipment UE identifies traffic flows with packet classifiers.

Figure 7:
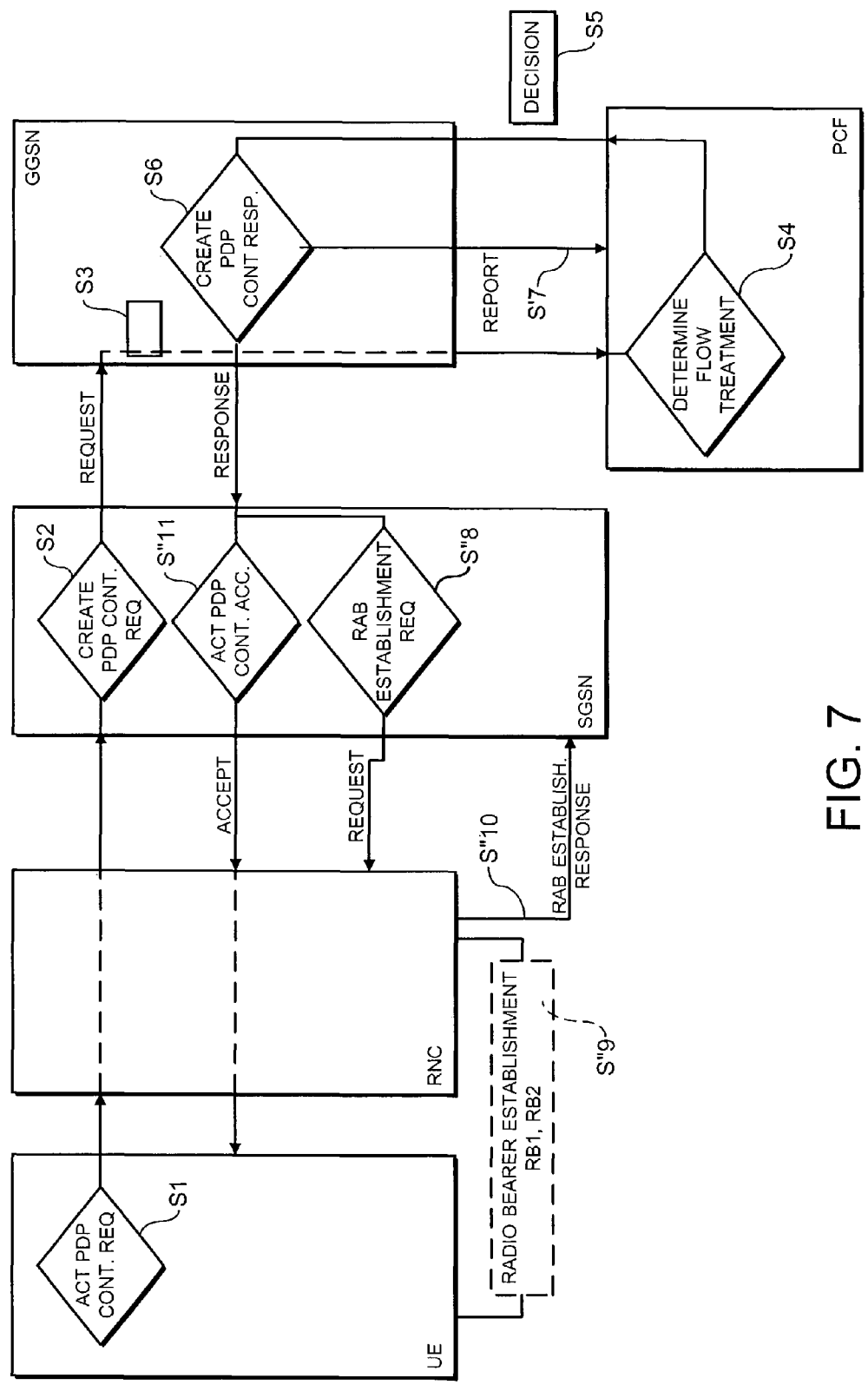
FIG. 7 is a schematic functional diagram of a third embodiment of the invention.

FIG. 7 illustrates a third embodiment of the invention. In FIG. 7, steps S1 to S6 are the same as described above with reference to FIGS. 3 and 5. In this case however, instead of establishing multiple RABs, the SGSN 8 establishes step S"8) a single radio access bearer RAB which identifies a packet classifier and the flow attributes of each of the flows and also identifies the fact that a different treatment is required for Flow3. At the radio network controller 4, multiple radio bearers are established (step S"9) to take into account the differing treatments required as identified in the RAB establishment request. That is, according to step S"9 illustrated in FIG. 7, radio bearer RB1 is established to carry Flow1 and Flow2 and radio bearer RB2 is established to carry Flow3. The radio network controller 4 identifies traffic flows with packet classifiers and can classify traffic flows to the correct radio bearers. An RAB establishment response is returned from the radio network controller to SGSN 8 (step S"10).

The user equipment UE is informed which traffic flows are carried on which radio bearers. In the example given, the user equipment UE receives flow specific packet classifiers and flow attributes for RB1 and RB2. This way, the user equipment UE knows that RB1 carries Flow1 and Flow2 and RB2 carries Flow3 and thus the user equipment UE can send traffic to the network on the correct radio bearers. The user equipment UE identifies traffic flows with packet classifiers.

It shall be appreciated that although the above described user equipment UE initiated establishment of pathways, the establishment process may also be initiated by the network. For example, the GGSN may initiate the PDP context establishment by issuing a request for such.

The invention claimed is:

1. A method, comprising:
   receiving, from a user terminal, at a node of a network, a request to establish a communication pathway over the network;
   establishing the communication pathway in the network, the communication pathway includes a radio communication channel and a packet communication channel, and the request associates with at least one traffic flow, wherein the at least one traffic flow is associated with at least one flow treatment attribute determining the flow treatment requirement for the at least one traffic flow;
   identifying at least another traffic flow of the at least one traffic flow associated with the request which requires a different flow treatment across the network from other traffic flows; and
   initiating another request, by at least one packet network node rather than the user terminal, to establish at least another communication pathway over the network, the another request identifying flow attributes of the at least another traffic flow associated with the request that requires the different flow treatment, and establishing the at least another communication pathway in the network, the at least another communication pathway providing the different flow treatment to the at least another traffic flow associated with the request that requires the different flow treatment, wherein the request comprises a bearer request, and the another request comprises a secondary bearer activation.

2. A method according to claim 1, wherein the packet network node is a gateway node of a mobile communication system, the gateway node initiates the another request to establish a network requested secondary bearer activation, wherein the at least one packet network node initiates the another request without intervention by the user terminal.

3. A method according to claim 1, wherein the identifying the at least another traffic flow associated with the request which requires a different flow treatment is implemented at the at least one packet network node.

4. A method according to claim 1, wherein the identifying the at least another traffic flow associated with the request which requires a different flow treatment is implemented at a policy decision function node of the network.

5. A method according to claim 1, wherein the radio communication channel established between the at least one user terminal and the at least one radio network node comprises at least one radio bearer, wherein the establishing the communication pathway and the another communication pathway includes the establishing multiple radio bearers providing different flow treatments.

6. A method according to claim 1, wherein the at least one packet network node comprises a gateway general packet radio service serving node, and the network further comprises a serving general packet radio service support node, wherein each communication pathway comprises a radio access bearer between the user terminal and the serving general packet radio service support node, wherein the establishing the communication pathway and the another communication pathway comprises establishing multiple radio access bearers with different flow treatments.

7. A method according to claim 1, wherein the at least one flow treatment attribute comprises a quality of service policy.

8. A method according to claim 1, wherein the at least one flow treatment attribute comprises a charging policy.

9. A method according to claim 1, wherein the identifying the at least another traffic flow associated with the request is based on its associated attributes.

10. The method according claim 1, wherein the at least one packet network node is configured to activate the another communication pathway by sending a bearer activation message to the at least one user terminal in response to the request.

11. The method according to claim 1, wherein the user terminal goes through the bearer establishment process again to establish the another communication pathway.

12. A method according to claim 1, wherein the establishing of the communication pathway and the another communication pathway is implemented by establishing a bearer over the network.

13. The method of claim 1, wherein the bearer request comprises a packet data protocol context request and the secondary bearer activation comprises a packet data protocol context activation.

14. A system, comprising:
   at least one user terminal;
   at least one radio network node comprising an establishing unit configured to establish a radio communication channel between the at least one user terminal and the at least one radio network node;
   at least one packet network node comprising an establishing unit configured to establish a packet communication channel, wherein at least one traffic flow is associated with at least one flow treatment attribute determining the flow treatment requirement for the at least one traffic flow, and the user terminal or the packet network node is configured to issue a request to establish a communication pathway over the network, the communication pathway including the radio communication channel and the packet communication channel, the request identifies the at least one traffic flow;
   an identifier configured to identify at least another traffic flow associated with the request which requires a different flow treatment across the network from the other traffic flows;

an initiating unit configured to initiate another request, by at least one packet network node rather than the at least one user terminal, to establish at least one another communication pathway over the network, the another request comprising a bearer activation and identifying flow attributes of the at least another traffic flow associated with the request that requires the different flow treatment; and an establishing unit configured to establish the communication pathway, and the at least another communication pathway over the network, the at least another communication pathway providing the different flow treatment to the at least another traffic flow associated with the request.

15. A system according to claim 14, wherein the identifier is located at the at least one packet network node.

16. A system according to claim 14, further comprising a policy decision function network node at which the identifier is located.

17. A system according to claim 14, wherein the establishing unit is configured to establish a bearer across the network.

18. A system according to claim 14, wherein the establishing unit is configured to establish multiple radio bearers in the radio communication channel.

19. A system according to claim 14, wherein the establishing unit is configured to establish multiple radio access bearers in the radio communication channel.

20. A system according to claim 14, wherein
the at least one packet network node comprises a gateway general packet radio service serving node configured to initiate the request to establish the another communication pathway by sending an initiate bearer activation message to a serving general packet radio service support node,
the serving general packet radio service support node is configured to initiate a request to activate the another communication pathway by sending a bearer activation message to the at least one user terminal, and
the at least one user terminal goes through the bearer establishment process again.

21. The system of claim 14, wherein the bearer activation comprises a packet data protocol context activation.

22. A system comprising:
at least one user terminal;
at least one radio network node comprising an establishing unit configured to establish a radio communication channel between the at least one user terminal and the at least one radio network node;
at least one packet network node comprising another establishing unit configured to establish a packet communication channel, wherein at least one traffic flow is associated with at least one flow treatment attribute determining the flow treatment requirement for the at least one traffic flow, and the at least one user terminal or the at least one packet network node is configured to issue a request to establish a communication pathway over the network, the communication pathway including the radio communication channel and the packet communication channel, wherein the request identifies the at least one traffic flow;
an identifier configured to identify at least another traffic flow associated with the request which requires a different flow treatment across the network from other traffic flows;
an initiating unit configured to initiate another request, by the at least one packet network node rather than by the at least one user terminal, to establish at least another communication pathway over the network, the another request comprising a bearer activation and identifying flow attributes of the at least another traffic flow associated with the request that requires the different flow treatment; and
a further establishing unit configured to establish the communication pathway, and the at least another communication pathway over the network, the another communication pathway providing the different flow treatment to the at least another traffic flow associated with the request.

23. An apparatus, comprising:
an establishing unit configured to establish a packet communication channel in a network,
wherein at least one traffic flow in the network is associated with at least one flow treatment attribute determining the flow treatment requirement for the at least one traffic flow, and
wherein the apparatus is configured to establish a communication pathway over the network, the communication pathway including a radio communication channel and the packet communication channel; and
an identifier configured to identify at least another traffic flow associated with the request which requires a different flow treatment across the network from other traffic flows, wherein the apparatus is further configured to initiate, at a packet network node, a secondary request comprising a bearer activation to establish at least another communication pathway over the network, the secondary request identifying flow attributes of the at least another traffic flow associated with the request that requires the different flow treatment, and to establish the at least another communication pathway in the network, the another communication pathway providing the different flow treatment to the at least another traffic flow associated with the request.

24. The apparatus according to claim 23, wherein the establishing of the communication pathway and the another communication pathway is implemented by establishing a bearer over the network.

25. The apparatus according to claim 23, wherein the identifying the at least another traffic flow associated with the request which requires a different flow treatment is implemented at a policy decision function node of the network.

26. The apparatus according to claim 23, wherein the radio communication channel comprises at least one radio bearer, wherein the establishing the communication pathway and the another communication pathway includes the establishing multiple radio bearers providing different flow treatments.

27. The apparatus according to claim 23, wherein the at least one packet network node comprises a gateway general packet radio service serving node, and the network further comprises a serving general packet radio service support node, wherein each communication pathway comprises a radio access bearer between a user terminal and the serving general packet radio service support node, wherein the establishing the communication pathway and the another communication pathway comprises establishing multiple radio access bearers with different flow treatments.

28. The apparatus according to claim 23, wherein the at least one flow treatment attribute comprises a quality of service policy.

29. The apparatus according to claim 23, wherein the at least one flow treatment attribute comprises a charging policy.

30. The apparatus according to claim 23, wherein the identifier is configured to identify the at least another traffic flow associated with the request based on its associated attributes.

31. The apparatus of claim 23, wherein the request to establish at least one second communication pathway is a bearer activation.

32. An apparatus, comprising:
a transmitter configured to send a bearer request to a network node to establish a communication pathway, the request associates with at least one traffic flow wherein the at least one traffic flow is associated with at least one flow treatment attribute determining the flow treatment requirement for the at least one traffic flow;
a receiver configured to receive a bearer response from the network node;
an acceptance message transmitter configured to transmit the bearer acceptance message to a user equipment; and
an initiator configured to initiate another request to activate a another communication pathway by sending a bearer activation message to the user equipment, the another request comprising a bearer activation and identifying flow attributes of at least another traffic flow associated with the request that requires a different flow treatment from other traffic flows, the initiator further being configured to establish the another communication pathway that provides the different flow treatment to the at least another traffic flow associated with the request.

33. The apparatus according to claim 32, wherein the apparatus is configured to establish multiple radio access bearers when establishing multiple communication pathways.

34. The apparatus of claim 32, wherein the bearer activation comprises a packet data protocol context activation.

35. An apparatus, comprising:
a requester configured to issue a request to establish a communication pathway over a network, the communication pathway including a radio communication channel and a packet communication channel;
a receiver configured to receive a response indicating acceptance of the request to establish a communication pathway;
an initiator configured to initiate a procedure to establish the communication pathway; and
a communication requester, at one or more packet network nodes, configured to make another request to establish a another communication pathway when an active message is received from the network, the another request comprising a bearer activation and identifying flow attributes of at least one traffic flow of the communication pathway that requires a different flow treatment from other traffic flows of the communication pathway, the communication requester further being configured to establish the another communication pathway that provides the different flow treatment to the at least one traffic flow.

36. A method, comprising:
establishing a packet communication channel in a network, wherein at least one traffic flow in the network is associated with at least one flow treatment attribute determining the flow treatment requirement for the at least one traffic flow;
establishing a communication pathway over the network, the communication pathway including a radio communication channel and the packet communication channel;
identifying at least another traffic flow associated with the request which requires a different flow treatment across the network from other traffic flows;
initiating, at a packet network node rather than a user terminal, another request to establish at least another communication pathway over the network, the secondary request comprising a bearer activation and identifying flow attributes of the at least another traffic flow associated with the request that requires the different flow treatment; and
establishing the another communication pathway in the network, the another communication pathway providing the different flow treatment to the at least another traffic flow associated with the request.

37. A non-transitory computer readable medium on which a computer program is embodied, and when the computer program is executed, a processor provides operations comprising:
receiving, at a node of a network, a request to establish a communication pathway over the network and establishing the communication pathway in the network, the communications pathway includes a radio communication channel and a packet communication channel, and the request associates with at least one traffic flow, wherein the at least one traffic flow is associated with at least one flow treatment attribute determining the flow treatment requirement for the at least one traffic flow;
identifying at least another traffic flow associated with the request which requires a different flow treatment across the network from the at least one traffic flow; and
initiating, by at least one packet network node rather than a user terminal, another request to establish at least another communication pathway over the network, the another request comprising a bearer activation, identifying flow attributes of the at least another traffic flow associated with the request that requires the different flow treatment, and establishing the at least another communication pathway in the network, the at least another communication pathway providing the different flow treatment to the at least another traffic flow associated with the request, wherein the first request comprises a bearer request.

38. A non-transitory computer readable storage medium on which a computer program is embodied, and when the computer program is executed, a processor provides operations comprising:
establishing a packet communication channel in a network, wherein at least one traffic flow in the network is associated with at least one flow treatment attribute determining the flow treatment requirement for the at least one traffic flow;
establishing a communication pathway over the network, the communication pathway including a radio communication channel and the packet communication channel;
identifying at least another traffic flow associated with the request which requires a different flow treatment across the network from other traffic flows;
initiating, at a packet network node rather than a user terminal, a another request to establish at least another communication pathway over the network, the request comprising a bearer activation and identifying flow attributes of the at least another traffic flow associated with the request that requires the different flow treatment; and
establishing the at least another communication pathway in the network, the another communication pathway providing the different flow treatment to the at least another traffic flow associated with the request, wherein the secondary request comprises another bearer request.

* * * * *

UNITED STATES PATENT AND TRADEMARK OFFICE
CERTIFICATE OF CORRECTION

PATENT NO. : 8,488,462 B2
APPLICATION NO. : 10/331941
DATED : July 16, 2013
INVENTOR(S) : Tuija Hurtta et al.

It is certified that error appears in the above-identified patent and that said Letters Patent is hereby corrected as shown below:

In the Claims

Column 10, lines 12 - 36, Claim 23 should read

-- 23. An apparatus, comprising:

an establishing unit configured to establish a packet communication channel in a network, wherein at least one traffic flow in the network is associated with at least one flow treatment attribute determining the flow treatment requirement for the at least one traffic flow, and wherein the apparatus is configured to establish a communication pathway over the network, the communication pathway including a radio communication channel and the packet communication channel; and an identifier configured to identify at least another traffic flow associated with [[the]] a request which requires a different flow treatment across the network from other traffic flows, wherein the apparatus is further configured to initiate, at a packet network node, a secondary request comprising a bearer activation to establish at least another communication pathway over the network, the secondary request identifying flow attributes of the at least another traffic flow associated with the request that requires the different flow treatment, and to establish the at least another communication pathway in the network, the another communication pathway providing the different flow treatment to the at least one another traffic flow associated with the request. --

Column 11, line 52 - Column 12, line 9, Claim 36 should read

-- 36. A method, comprising:

Signed and Sealed this
Twenty-sixth Day of August, 2014

Michelle K. Lee
*Deputy Director of the United States Patent and Trademark Office* establishing a packet communication channel in a network, wherein at least one traffic flow in the network is associated with at least one flow treatment attribute determining the flow treatment requirement for the at least one traffic flow;

establishing a communication pathway over the network, the communication pathway including a radio communication channel and the packet communication channel;

identifying at least another traffic flow associated with [[the]] a request which requires a different flow treatment across the network from other traffic flows;

initiating, at a packet network node rather than a user terminal, another request to establish at least another communication pathway over the network, the secondary request comprising a bearer activation and identifying flow attributes of the at least another traffic flow associated with the request that requires the different flow treatment; and establishing the another communication pathway in the network, the another_communication pathway providing the different flow treatment to the at least another traffic flow_associated with the request. --

Column 12, lines 38 - 65, Claim 38 should read

-- 38. A non-transitory computer readable storage medium on which a computer program is embodied, and when the computer program is executed, a processor provides operations comprising:

establishing a packet communication channel in a network, wherein at least one traffic flow in the network is associated with at least one flow treatment attribute determining the flow treatment requirement for the at least one traffic flow;

establishing a communication pathway over the network, the communication pathway including a radio communication channel and the packet communication channel;

identifying at least another traffic flow associated with [[the]] a request which requires a different flow treatment across the network from other traffic flows;

initiating, at a packet network node rather than a user terminal, a another request to establish at least another communication pathway over the network, the request comprising a bearer activation and identifying flow attributes of the at least another traffic flow associated_with the request that requires the different flow treatment; and establishing the at least another communication pathway in the network, the another_communication pathway providing the different flow treatment to the at least another traffic flow_associated with the request, wherein the secondary request comprises another bearer request. --